(No Model.)
H. W. VIETMEYER.
TWO WHEELED VEHICLE.
No. 411,843. Patented Oct. 1, 1889.
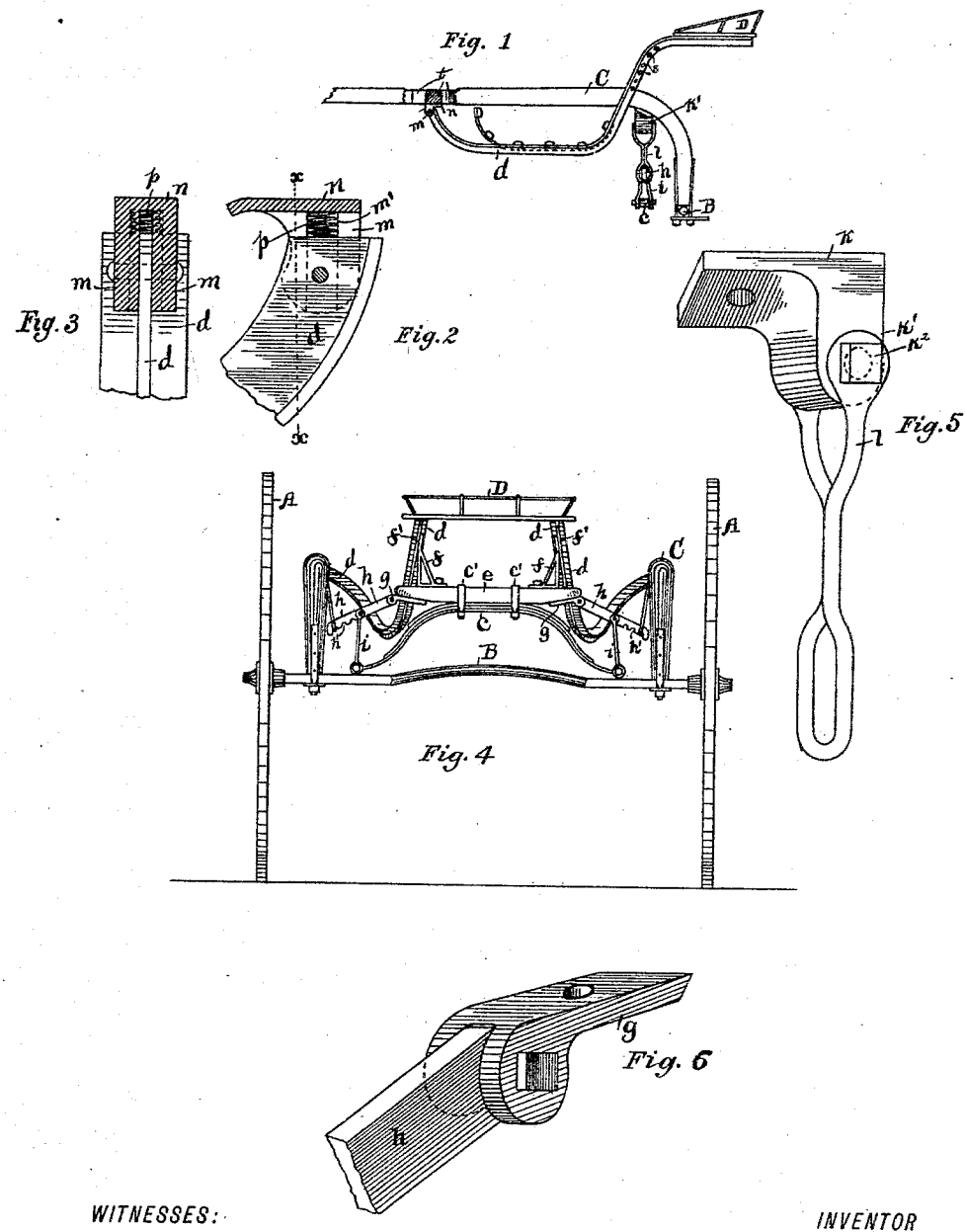
WITNESSES:
Coleman A. Berry
George Piper
INVENTOR
Henry W. Vietmeyer
BY C. C. Shepherd
ATTORNEY.

UNITED STATES PATENT OFFICE.

HENRY W. VIETMEYER, OF COLUMBUS, OHIO.

TWO-WHEELED VEHICLE.

SPECIFICATION forming part of Letters Patent No. 411,843, dated October 1, 1889.

Application filed July 22, 1889. Serial No. 318,282. (No model.)

*To all whom it may concern:*

Be it known that I, HENRY W. VIETMEYER, a citizen of the United States, residing at Columbus, in the county of Franklin and State of Ohio, have invented a certain new and useful Improvement in Two-Wheeled Vehicles, of which the following is a specification.

My invention relates to the improvement of two-wheeled vehicles or carts; and the objects of my invention are to provide a vehicle of this class with adjustable scale-beams so constructed and connected with the vehicle as to admit of their being adjusted to regulate the supporting-power of the spring for different weights; to admit of the use in conjunction with said attachments of an ordinary half-leaf spring; to so connect said scale-beams with the vehicle-shafts as to prevent the forward and backward movement of the spring and yet admit of the desired amount of lateral and vertical play of the same; to provide superior means for adjusting the height of the vehicle-seat; to connect the seat-supporting irons with the shaft-circle bar, so as to obviate the tendency of the parts to rattle, and to accomplish these objects in a simple and inexpensive manner. These objects I accomplish in the manner illustrated in the accompanying drawings, in which—

Figure 1 is a side elevation of a two-wheeled vehicle, showing the wheels removed and having my improvement connected therewith. Fig. 2 is a vertical central section of one of the hinge-plates connecting the circle-bar and seat-supporting iron. Fig. 3 is a section taken on line $x\ x$ of Fig. 2. Fig. 4 is a rear end elevation of a two-wheeled vehicle, showing my improved scale-beam connected therewith. Fig. 5 is a view in perspective of one of the hinge-plates with which is connected, by means of hangers, the adjustable scale-beams. Fig. 6 is a perspective view in detail showing the connection of the scale-beams and spring-bar hinge-plate.

Similar letters refer to similar parts throughout the several views.

A represents the wheels, B the axle, and C the thills or shafts, the latter being connected with the axle in the usual manner.

$d\ d$ represent the seat-supporting bars, which, as shown, are formed of T-iron and have their forward ends hinged to the shaft-circle bar in the manner hereinafter specified; while the rear portions are curved upward and made to support a seat D in the usual manner.

$c$ represents an ordinary half-leaf spring having its upper and central portion bound by clips $c'$ to a horizontal spring-bar $e$. This spring and its bar are supported, as shown, and hereinafter described, slightly in front of the axle and beneath the seat. Bolted or otherwise secured to the upper side of the spring-bar near each end thereof is the foot of an upwardly-extending bracket or arm $f$, the upper end of which is provided with an outwardly-projecting pin $f'$, which is made to pass and project through the desired one of a number of pin-holes $s$, formed in the adjoining seat of the bar $d$.

Secured to the under side of the spring-bar $e$, adjoining each of its ends, is a hinge-plate $g$, to the outer end of each of which is jointedly connected the inner end of a scale beam or bar $h$, which extends outwardly to a point beyond the outer end of and approximately parallel with the spring $c$. Each of these scale-bars has formed on its under side in its outer portion two or more notches $h'$, as shown, and is connected at about the center of its length with the corresponding outer end of the spring by means of a short link or rod $i$, which has its respective ends pivotally connected with said scale-beam and spring end.

Secured to the under side of the rear portion of each of the thills C at about the point where the latter is bent forwardly in a horizontal line is a hinge-plate or lug $k$, one end of which is provided with a short downward extension $k'$. This extension $k'$ is provided with a bolt-hole running in a parallel direction with the thill. Made to pass through this hole is a bolt or pin $k^2$, on the outer projecting ends of which are respectively supported pivotally or jointedly the divided arms of the upper end of a hanger $l$. The lower end of this hanger is in the form of a loop, as shown, and is adapted to be made to engage, as shown in Fig. 4 of the drawings, with the desired one of the notches $h'$ of the scale-beam on that side.

Owing to the fact that each of the beams $h$ projects beyond the corresponding end of the spring $e$, and owing to the pivotal connection of said scale-beams and spring, it will be seen that when the lower end of the thill-hanger $l$ is supporting the outer end of the beam $h$ by engaging with the outer notch thereof, or any notch beyond the outer end of the spring, the length of said spring will be practically increased, the scale-beam acting as an extension thereof. The length of the connecting rods or links $i$ and hangers $l$ are such as to hold the scale-beams $h$ in approximately parallel lines with the outer portions of the spring, which greatly assists the beams in the proper performance of their offices of spring-extensions. When the weight on the seat is to be increased—for instance, when there are more than one person to ride thereon—it will be seen that the hangers $l$ may be made to engage with the desired one of the inner notches of the beams $h$, which will operate to practically decrease the length of the spring, and thus enhance its utility for heavy weights. The upper arms of the hanger $l$ being hinged, as shown and described, against the forward and rear side of the hinge-plate $k$, it will be seen that any tendency of the spring $c$ to be pulled forward or backward, which is well known to be injurious to the spring, will, through the connection of said hanger therewith, be obviated.

In case it is desired to raise or lower the seat it may be accomplished by removing the bolts which connect the brackets $f$ and the seat-bars $d$, and drawing the brackets inward until the pins $f'$ thereof are released from engagement with said seat-bars. The seat and its supporting-bars may then be raised or lowered to the desired point, when the bracket-pins may each be made to again engage with one of the pin-holes $s$ of the seat-bar flange and the lower ends of said brackets may be again bolted to the spring-bar.

The forward end of each of the seat-bars is pivotally connected with the usual shaft circle-bar $t$ by having its central rib or flange hinged or pivoted between the lower portions of two downwardly-parallel extending lugs $m$ of a plate $n$, the latter being secured, as shown, to the circle-bar. Each of these downwardly-extending lugs $m$ is provided with a central and vertical depression or recess $m'$ on its inner surface, which extends from the under side of the plate $n$ to the lower end of said lugs. The object of these vertical depressions is to admit of the insertion between the lugs $m$ to the upper end of said lugs of a short section of coiled spring $p$, which, as shown, is made to bear within the upper portion of said depressions and between the upper end of the seat-bar and the lower side of the plate $n$. As will be readily seen, these springs form cushions for the forward ends of the seat-bar and serve to hold them in such connection with the thill-plates and their lugs as to prevent rattling.

It will be seen that the parts herein shown and described are comparatively simple in construction and may be manufactured at a slight expense.

Although the scale-beams herein shown are described as being connected at their inner ends with the spring-bar, it is obvious that said beams may be connected with the seat-bars or other parts of the vehicle-frame, if desired.

Having now fully described my invention, what I claim, and desire to secure by Letters Patent, is—

1. In a two-wheeled vehicle, a scale-beam for the purpose of practically increasing or decreasing the length of the vehicle-spring, said beam being jointedly connected with said spring and its bar and adjustably supported by hangers, substantially as described.

2. The combination, with the frame-work of a two-wheeled vehicle, of a scale-beam for the purpose of practically increasing or decreasing the length of the vehicle-spring, said beam being jointedly connected with said spring and adjustably supported by hangers, substantially as and for the purpose specified.

HENRY W. VIETMEYER.

In presence of—
J. J. THORNBURGH,
BARTON GRIFFITH.